March 29, 1960     E. F. HIGGINS     2,930,118
METHOD OF MANUFACTURING A BOX END THREAD PROTECTOR
FOR SUCKER ROD COUPLINGS AND THE LIKE
Filed Aug. 6, 1956

INVENTOR

EDWARD F. HIGGINS

BY *Jerome A. Gross*

ATTORNEY

United States Patent Office 2,930,118
Patented Mar. 29, 1960

2,930,118

METHOD OF MANUFACTURING A BOX END THREAD PROTECTOR FOR SUCKER ROD COUPLINGS AND THE LIKE

Edward F. Higgins, Kirkwood, Mo.

Application August 6, 1956, Serial No. 602,274

3 Claims. (Cl. 29—528)

The present invention relates to thread protectors, and particularly to protecting oil-well sucker rod couplings under extreme conditions of moisture, painting, heat and dirt. The protectors of the present invention are also used on those sucker rods having internally threaded, or "box" ends.

Sucker rods and their couplings are used in highly corrosive environments. Therefore, before they are shipped from the factory, they are ordinarily protected by a baked-on paint finish. The end surfaces and the threads must be completely protected from the entrance of any such paint. After shipment from the factory, sucker rods and their couplings are generally exposed to the elements; they may lie in melting snow or in pools of rain. Moisture entering the end surfaces and threads can precipitate corrosion of an extremely detrimental nature, and must be prevented.

Heretofore, pressed steel thread protectors have been used, having flanges covering the end surfaces. Unless these were made very thick and provided with a machined fit, they could not reliably prevent the entrance of moisture against the end faces of the couplings or box ends; and if tightened in place with too much torque, the flanges would bend inward and warp.

The objects of the present invention include providing a relatively ductile metal thread protector of such construction as will seal against paint, moisture and dirt under all conditions, and will also avoid impact damage to threads.

The purposes also include providing a secure seal to protect not only the threads but also the end surfaces, even though excessive torque is used to tighten the protectors.

A still further purpose is to take advantage of the minute, annular tool marks in the machined end surfaces of the couplings or sucker rods, to effect a better seal.

An additional purpose is to provide a cast metal box end thread protectors without expensive trimming operations, such as extremely close flash trimming, grinding or polishing; and to provide a simple process for their manufacture.

In the drawings:

Figure 3 shows such a sectional view through an unfinished casting. Figure 4 shows the piece finished by straightening the flange and embossing an annular sealing ridge.

Figure 1:
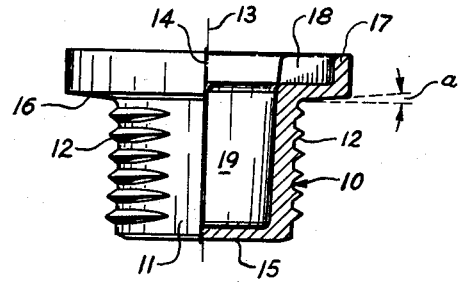
Figure 1 is a side view, partly in elevation and partly in section, of an unfinished zinc thread protector casting.
Figure 2:
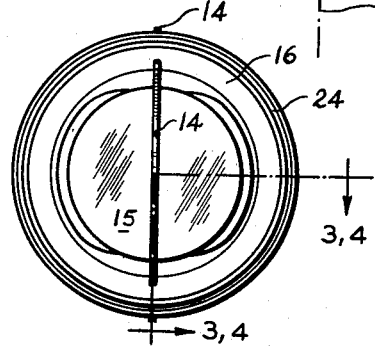
Figure 2 is a bottom view of the finished protector.

The unfinished casting shown in Figure 1 comprises a die-cast zinc body generally designated 10, having a substantially cylindrical outer shell surface 11 including discontinuous thread elements 12 located outwardly from a parting line 13. The outer shell surface 11 has no projection closely adjacent the parting line, and the ends of the thread elements 12 (as shown in Figure 2) are removed sufficiently outward from the parting line and have enough taper to permit trimming of the flash by a simple shearing die operation. Even after such flash trimming, however, there will be a low ridge, perhaps .002 to .003 in height, extending around the entire outer parting line surface. This is referred to as the trimmed flash ridge 14. As shown to the left in Figure 4, it will not interfere with screwing the protector into the coupling end.

The die-cast body 10 has a bottom surface 15 at its inner end, and at its outer end has an annular flange 16 of substantially the same width as the end surface of the part to be protected, cast at a sufficient draft angle $a$ to permit parting of the mold. Upstanding from the outer edge of the annular flange 16 is a rim 17, within which protrude a plurality of internal lugs 18, used for tightening or loosening the thread protector with a screwdriver, and which also serves to give a degree of added rigidity to the rim 17. Within the shell is a substantially hexagonal cavity 19, utilized for wrenching.

Figure 3:
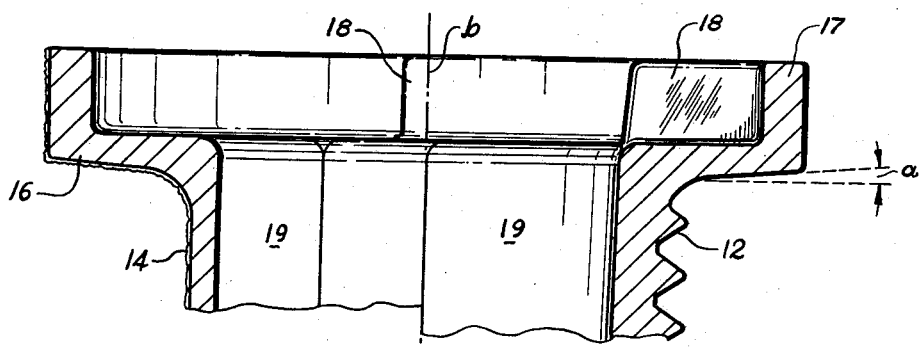
Figures 3 and 4 are enlarged sectional views taken along line 3, 4—3, 4 of Figure 2.

As shown in the enlarged Figure 3, the unfinished casting is unfit for use as a protector of a sucker rod coupling (shown fragmentarily in Figure 4 and generally designated 20) for two reasons: the trimmed flash ridge 14 would hold the flange 16 away from the annular end face 21 of the coupling 20; and the draft angle $a$ on the flange 16 is such that the only contact which could be made would be along the inner edge of the annular end face 21, adjacent the inner champfer 22 of the coupling 20. Adequate protection requires that the annular end face 21 be protected out to the outer champfer 23.

These deficiencies are overcome by placing the unfinished casting, as shown in Figures 1 and 3, in a punch press and striking in a line of movement parallel to the thread axis $b$ of the protector. The die-stamping operation serves at least two purposes: it flattens the flange 16, bringing it into planarity and eliminating the draft angle $a$; and it embosses a continuous annular sealing ridge 24 adjacent the outer edge of the flange 16 and directly beneath the rim 17. Embossing the sealing ridge 24 eliminates the trimmed flash ridge 14 immediately adjacent the sealing ridge 24. The fact that the rim 17 is solid permits it to react the force necessary for embossing. The sealing ridge 24 then projects from a substantially flat flange, and in the same direction along the thread axis $b$ as the body 10.

The annular sealing ridge 24 is preferably V-shaped, and when first embossed has a sharply defined sealing ridge edge 25. Inasmuch as the die-cast material is ductile and malleable, as compared to the steel utilized in the couplings and rod ends, it will tend to deform readily upon being screwed tightly against the annular end face 21 of the coupling or box end rod.

Sealing is accomplished by such deformation, and is augmented by reason of the following: The annular end face 21 is ordinarily machined but not ground or polished, and therefore contains annular tool marks 26 which are in effect minute grooves. These are shown somewhat exaggerated in Figure 4. As the protector is screwed so that its thread elements 12 engage the internal threads 27 of the coupling and draw the protector inward, concentrating the force of contact along the ridge edge 25, said edge 25 is wiped against the annular tool marks 26 and is deformed complementary to the contour of the tool marks 26.

Figure 4:
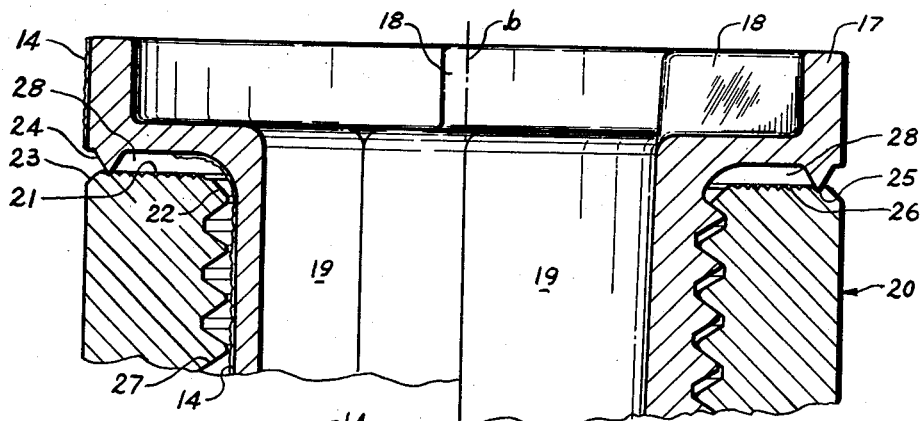

If the wrenching be continued even to the point of bending the flange 16 slightly, there will nevertheless be a continued seal between the ridge edge 25, as so deformed, and the rod end face 21. This is due to the fact that, by straightening the flange 16 to remove the draft angle $a$, and by the projection of the sealing ridge 24 downward from the flange 16, an annular clearance area designated 28 is provided inward of the sealing ridge 24. This clearance area, shown in cross-section in Figure 4, is adequate to permit a certain amount of flange bending, still holding the flange spaced from the end face 21. However, the greater bending rigidity which comes from using a greater thickness of light-weight material minimizes the tendency to bend.

Important in the present invention is the simple method by which the protector is made. The die-casting of zinc and similar relatively ductile metals is a familiar process. A two-part mold having a parting plane, with thread elements remote from the parting plane, is simply constructed. Since the flange is flattened after casting, the draft angles may be adequate for easy production.

On removing the cast parts from the mold, the flash is readily trimmed, as by a simple shearing die, to a height which will not interfere with the screwing into the coupling. The protector is then completed in the stamping operation, above described, whereby the annular sealing ridge 24 is embossed simultaneously with the flattening of the flange rim 17. Accordingly the cost of manufacture is kept low, which is important considering the parts are dispensable and not intended for reuse.

Although reference has been made to the use of the zinc diecast 10, other materials on which an annular ridge such as the sealing ridge 24 can be raised, could likewise be used. Certain other changes may be made, in some instances sacrificing certain of the advantages of the present invention, without departing from the scope hereof. Accordingly, the present invention is not to be construed narrowly, but as fully coextensive with the scope of the claims which follow.

I claim:

1. A method of manufacturing flanged threaded sucker rod coupling box end protectors comprising the steps of casting a flanged metal protector body in a mold having a lengthwise parting plane, the flange having a draft angle, removing the cast part from the mold, trimming the flash down, stamping the flange in a direction parallel to the axis of the threads, thereby embossing a continuous annular sealing ridge adjacent the outer portion of the flange, and simultaneously flattening the flange relative to the protector body whereby to remove the draft angle.

2. A method of manufacturing sucker rod coupling box end protectors including discontinuous thread elements, comprising the steps of casting a flanged metal protector body in a two-part mold having a parting plane dividing discontinuous thread elements, the flange having a draft angle, removing the cast part from the mold, trimming the flash down so its height between the discontinuous thread elements will not affect screw engagement, stamping the flange in a direction parallel to the axis of the threads, thereby embossing a continuous annular sealing ridge adjacent the outer portion of the flange, and simultaneously flattening the flange relative to the protector body whereby to remove the draft angle.

3. A method of manufacturing flanged sucker rod coupling box end protectors comprising the steps of casting a flanged metal protector body in a mold having a lengthwise parting plane dividing discontinuous thread elements, the flange having a draft angle, then removing the cast part from the mold, and then stamping the flange in a direction parallel to the axis of the thread elements to flatten the flange relative to the protector body whereby to remove the draft angle.

References Cited in the file of this patent

UNITED STATES PATENTS

| Re. 18,184 | Brown et al. | Sept. 8, 1931 |
| 994,020 | McConway | May 30, 1911 |
| 1,389,542 | Wereley | Aug. 30, 1921 |
| 1,853,946 | Unke | Apr. 12, 1932 |
| 2,026,878 | Farr | Jan. 7, 1936 |
| 2,223,202 | Bergan | Nov. 26, 1940 |
| 2,730,136 | Phillips | Jan. 10, 1956 |
| 2,770,260 | Henderson | Nov. 13, 1956 |